United States Patent [19]

Succi et al.

[11] Patent Number: 5,294,407
[45] Date of Patent: Mar. 15, 1994

[54] GAS PURIFIER HAVING PRESSURE RESPONSIVE SWITCH AS END OF LIFE DETECTOR

[75] Inventors: Marco Succi; Carolina Solcia, both of Milan, Italy

[73] Assignee: SAES Getters SpA, Milan, Italy

[21] Appl. No.: 770,328

[22] Filed: Oct. 3, 1991

[30] Foreign Application Priority Data

Nov. 23, 1990 [IT] Italy .................... 22166 A/90

[51] Int. Cl.$^5$ .................. G01D 11/26; B01D 50/00
[52] U.S. Cl. .................. 422/119; 422/168; 55/274; 55/523; 55/DIG. 34
[58] Field of Search ........... 55/274, 523, DIG. 34; 422/119, 168; 200/61.04; 340/626, 632

[56] References Cited

U.S. PATENT DOCUMENTS

| | | | |
|---|---|---|---|
| 4,444,727 | 4/1984 | Yanagihara et al. | 422/223 |
| 4,552,570 | 11/1985 | Gravatt | 55/20 |
| 4,925,619 | 5/1990 | Sparrow et al. | 376/258 |
| 5,059,952 | 10/1991 | Weu | 340/573 |

*Primary Examiner*—Robert J. Warden
*Assistant Examiner*—Christopher Y. Kim
*Attorney, Agent, or Firm*—David R. Murphy

[57] ABSTRACT

A gas purifier for impure gas having an end of life detector. The purifier has:

A. a housing; and
B. an impurity-sorbing material packed within the housing. The impurity-sorbing material has the property of reacting with impurities in the impure gas. This reacting causes expansion of the impurity-sorbing material; and
C. an impure gas inlet; and
D. a pure gas outlet; and
E. a pressure responsive electrical switch within the housing. The position of the switch is responsive to expansion of the impurity-sorbing material; and
F. An indicator outside the housing to indicate the position of the switch.

11 Claims, 1 Drawing Sheet

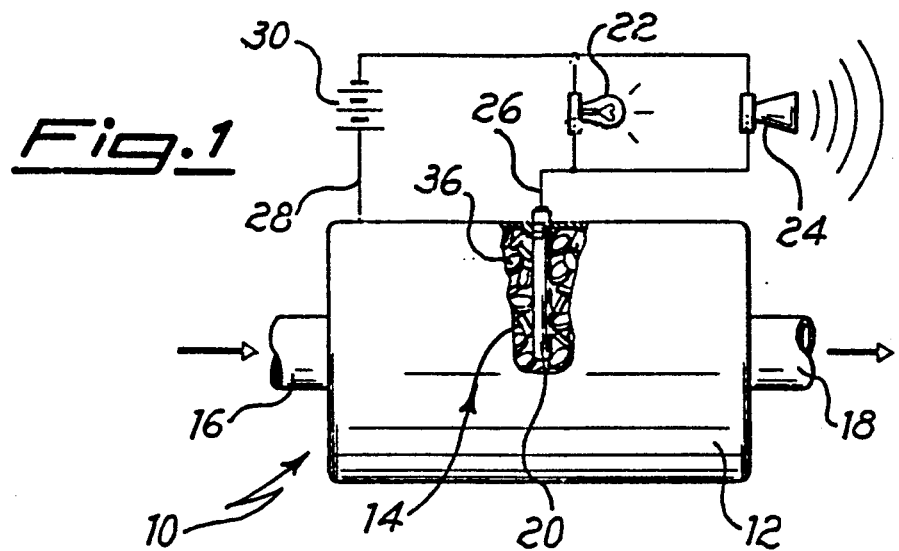
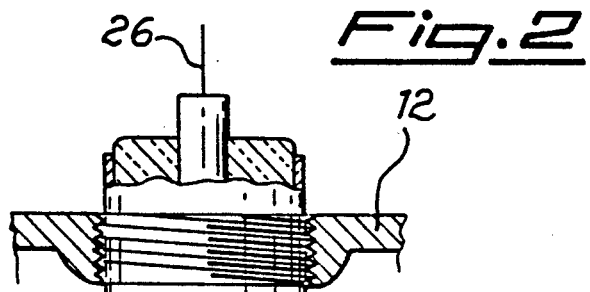
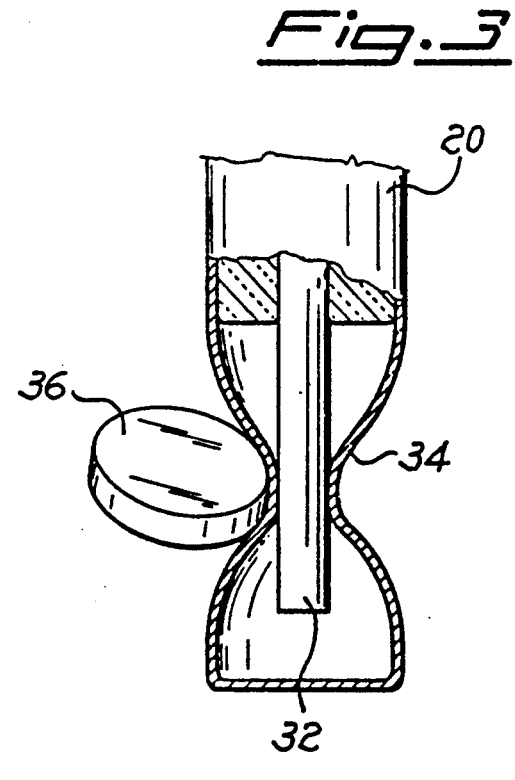

GAS PURIFIER HAVING PRESSURE RESPONSIVE SWITCH AS END OF LIFE DETECTOR

BACKGROUND TO THE INVENTION

Gas purifiers for removing impurities from impure gas are well known. These known purifiers typically have a housing in fluid communication with an inlet and an outlet. As impurity-sorbing material is located within the housing.

Considerable difficulty has been encountered in attempting to determine when this impurity-sorbing material has come to the end of its life. In general the impurity-sorbing material has come to the end of its life when it no longer sorbs the impurities in the impure gas. However it is difficult and expensive to determine the end of life of the impurity sorbing material by measuring the impurities in the outlet gas. For this reason recent Attempts to determine the end of life of the impurity-sorbing material have been centered around the impurity-sorbing material itself. Some prior end of life sensors have been placed in the gas stream; but placing the sensor there can cause contamination of the gas. Other prior end of life sensors ave experienced a wide variety of other problems.

BRIEF OBJECTS OF THE INVENTION

Accordingly it is an object of the present invention to provide an end of life sensor substantially free of one or more of the disadvantages possessed by prior end of life detectors.

Another object is to provide a gas purifier with an end of life detector that is inexpensive to manufacture, easy to install, reliable to operate, and easy to replace.

Additional objects and advantages of the present invention will be apparent to those skilled in the art by reference to the following detailed description and drawings wherein:

BRIEF DESCRIPTION OF THE FIGURES

FIG. 1 is a skematic representation of a gas purifier of the present invention; and FIG. 2 is an enlarged view of a switch useful in the gas purifier of FIG. 1, wherein the switch is in the open position; and FIG. 3 is a view of the switch of FIG. 2 in the closed position.

DETAILED DESCRIPTION OF THE INVENTION

The above and other objects are accomplished according to the present invention by providing a gas purifier for impure gas having:
A. a housing; and
B. an impurity-sorbing material packed within the housing wherein the impurity-sorbing material has the property of reacting with impurities in the impure gas wherein the reacting causes expansion of the impurity-sorbing material; and
C. an impure gas inlet; and
D. an impure gas outlet; and
E. a pressure responsive electrical switch within the housing, wherein the position of said switch is responsive to expansion of the impurity-sorbing material; and
F. means outside the housing to determine the position of the switch.

Referring now to the drawings and in particular to FIG. 1 there is shown a gas purifier 10 of the present invention having an end of life detector. The gas purifier 10 comprises a gas-tight, electrically conductive housing 12. An impurity sorbing material 14 is packed within the housing. The impurity-sorbing material 14 completely fills the housing 10 leaving only passages for the impure gas. The impurity-sorbing material 14 has the property of reacting with impurities in the impure gas. This reaction causes expansion of the impurity-sorbing material 14.

The purifier 10 also has an impure gas inlet 16 for feeding impure gas to the housing 12 as well as a pure gas outlet 18 for removing purified gas from the housing 12. The purifier 10 is equipped with a pressure responsive electrical switch 20. When the switch 20 is closed in response to expansion of the impurity-sorbing material 14 a light 22 lights and a horn 24 blows both indicating the end of life of the impurity-sorbing material 14.

The switch 20 is in series with the conductor 26, the conductor 28, the light 22, and the power source 30.

FIG. 2 shows an enlarged partially cut-away view of switch 20 comprising a casing 34, deformable in response to expansion of impurity sorbing material 14, and distanced away from a rod 32 which is connected to conductor 28.

As shown in FIG. 2 the circuit is open and the light 22 is out because the rod 32 does not contact the casing 34.

As shown in FIG. 3 the impurity-sorbing material in the form of the pill 36 has expanded causing the casing 34 to contact the rod 32, completing the circuit, lighting the light 22 and blowing the horn 24.

In fact the switch 20 comprises one contact in the form of a rod 22 surrounded by another contact in the form of a crushable casing 34 wherein the switch 20 is closed in response to the expansion of the impurity-sorbing material which crushes the crushable casing 34 causing the crushable casing to contact the rod 22 thereby closing the switch 20.

In the embodiment shown the switch closes to indicate end of life. It is within the skill of the art to modify the structure herein so that instead of closing the switch opens.

Of course either the light 22 or the horn 24 can be replaced by other end of life indicia.

A wide variety of gas-sorbing materials can be used in the gas purifier of the present invention as long as they undergo volumetric expansion as they sorb impurities. Examples of suitable materials include among others alloys of zirconium, and of titanium. Examples of specific suitable alloys include alloys of Zr, V, and Fe; and $Zr_2Fe$.

Any impure gas can be purified as long as the impurity sorbing material sorbs the impurities in the gas. Examples of impure gases include impure noble gases such as impure argon and impure neon. Impure nitrogen can also be purified.

Although the invention has been described with respect to a preferred embodiment it will be understood that variations can be effected in the invention as described above and as defined in the appended claims.

What is claimed is:

1. A gas purifier for impurity-containing gas having an end of life detector, said gas purifier comprising:
A. a housing; and
B. an impurity-sorbing material packed within the housing wherein said impurity-sorbing material has the property of reacting with impurities in an impurity-containing gas wherein the reacting causes expansion of the impurity-sorbing material; and C. an impurity-containing gas inlet; and D. a purified gas outlet; and E. a pressure responsive electrical switch within the housing, wherein the position of said switch is responsive to expansion of the impurity-sorbing material; and F. means outside the housing to determine the position of the switch.

2. The gas purifier of claim 1 wherein the housing is cylindrical.

3. The gas purifier of claim 1 wherein the gas-sorbing material is $Zr_2Fe$.

4. The gas purifier of claim 1 including means for closing said switch in response to the expansion of the impurity-sorbing material.

5. The gas purifier of claim 1 including means for opening said switch in response to the expansion of the impurity-sorbing material.

6. The gas purifier of claim 1 wherein the means to determine the position of the switch is a visible means.

7. The gas purifier of claim 1 wherein the means to determine the position of the switch is a light.

8. The gas purifier of claim 1 wherein the means to determine the position of the switch is an audible means.

9. A gas purifier for impurity-containing gas having an end of life detector, said purifier comprising:

A. A gas-tight electrically-conductive housing; and

B. an impurity-sorbing material packed within the housing and completely filing the housing leading only passages for the impurity-containing gas wherein said impurity-sorbing material has the property of reacting with impurities in the impurity-containing gas wherein the reacting causes expansion of the impurity-sorbing material; and C. an impurity-contains gas inlet for feeding impure gas to the housing: and D. a purified gas outlet for removing purified gas from the housing; and E. a pressure responsive electrical switch within the housing, wherein the switch is closed in response to expansion of the impurity-sorbing material; and F. a light which lights when the switch is closed thus indicating the end of life of the impurity-sorbing material.

10. A gas purifier for impure gas having an end of life detector, said purifier comprising:

A. A gas-tight electrically-conductive housing; and

B. an impurity-sorbing material packed within the housing and completely filing the housing leaving only passages for an impure gas wherein said impurity-sorbing material has the property of reacting with impurities in the impure gas wherein the reacting causes expansion of the impurity-sorbing material; and C. an unpure gas inlet for feeding impure gas to the housing; and D. a pure gas outlet for removing purified gas from the housing; and E. a pressure responsive electrical switch within the housing wherein the switch comprises one contact in the form of a rod surrounded by another contact in the form of a crushable casing, wherein the switch is closed in response to expansion of the impurity-sorbing material which crushes the crushable casing causing the crushable casing to contact the rod thereby closing the switch; and F. A light which lights when the switch is closed thus indicating the end of life of the impurity-sorbing material 11. A gas purifier for impurity-containing gas having an end of life detector, said gas purifier comprising:

A. a housing; and

B. an impurity-sorbing material packed within the housing reacting with impurities in an impurity-containing gas wherein the reacting causes expansion of the impurity-sorbing material; and C. an impurity-containing gas inlet; and D. a purified gas outlet; and E. a pressure-responsive electrical switch within the housing;

wherein the switch comprises one contact surrounded by another contact which is a crushable casing;

wherein the switch is closed in response to expansion of the impurity-sorbing material which crushes the crushable casing causing the crushable casing to contact the rod thereby closing the switch; and F. means outside the housing to determine the position of the switch.

* * * * *

UNITED STATES PATENT AND TRADEMARK OFFICE
CERTIFICATE OF CORRECTION

PATENT NO. : 5,294,407
DATED : March 15, 1994
INVENTOR(S) : Succi, et al

It is certified that error appears in the above-indentified patent and that said Letters Patent is hereby corrected as shown below:

In Claim 9 at Column 3, Line 36 for "leading", read --leaving--.

In Claim 11 at Column 4, Line 33 after "housing" insert --wherein said impurity-sorbing material has the property of--.

Signed and Sealed this

Twenty-sixth Day of July, 1994

Attest:

BRUCE LEHMAN

*Attesting Officer*     *Commissioner of Patents and Trademarks*